350-333 SR

2/3/87 OR 4,640,582

United States Patent [19]

Oguchi et al.

[11] Patent Number: 4,640,582

[45] Date of Patent: Feb. 3, 1987

[54] SYSTEM FOR DRIVING A LIQUID CRYSTAL MATRIX DISPLAY SO AS TO AVOID CROSSTALK

[75] Inventors: Kikuo Oguchi; Yoshiro Uchikawa, both of Suwa, Japan

[73] Assignee: Kabushiki Kaisha Seiko Epson, Japan

[21] Appl. No.: 607,482

[22] Filed: May 7, 1984

[30] Foreign Application Priority Data

May 10, 1983 [JP] Japan .................................. 58-81129

[51] Int. Cl.[4] .................................................. G02F 1/13

[52] U.S. Cl. ...................................................... 350/333

[58] Field of Search .......................................... 350/333

[56] References Cited

U.S. PATENT DOCUMENTS 3,891,981 6/1975 Torresi ........................... 350/332 X 4,117,472 9/1978 Freer et al. ...................... 350/333 X 4,356,483 10/1982 Fujita et al. ..................... 350/332 X 4,405,209 9/1983 Funada et al. ................... 350/346 X 4,447,131 5/1984 Soma ................................... 350/333

4,541,690 9/1985 Clerc ................................... 350/333

*Primary Examiner*—John K. Corbin

*Assistant Examiner*—Richard F. Gallivan

*Attorney, Agent, or Firm*—Blum, Kaplan, Friedman, Silberman & Beran

[57] ABSTRACT

The invention relates to a system for driving a liquid crystal matrix display for use in a television wherein the signal applied to each pixel is inverted at a rate not greater than that necessary to scan a single pixel but greater than the rate necessary to cause crosstalk and in any event greater than the rate necessary to scan a line of pixels without inverting.

7 Claims, 6 Drawing Figures

FIG. 1
PRIOR ART
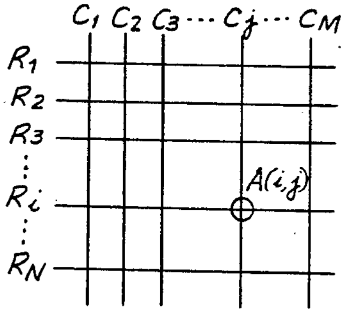
FIG. 2
PRIOR ART
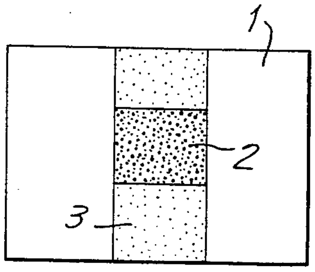
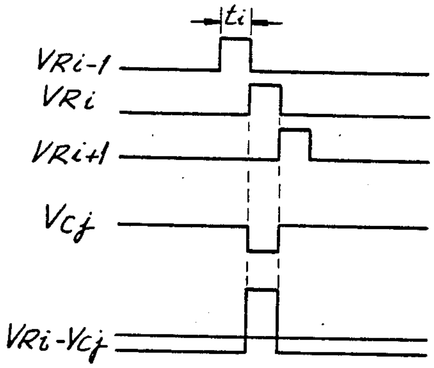
FIG. 3
PRIOR ART
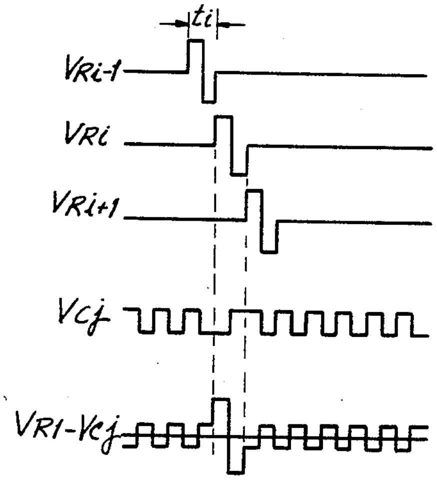
FIG. 4
PRIOR ART

SYSTEM FOR DRIVING A LIQUID CRYSTAL MATRIX DISPLAY SO AS TO AVOID CROSSTALK

BACKGROUND OF THE INVENTION

This invention relates generally to a method for driving a liquid crystal matrix display and more particularly to a method for driving a liquid crystal matrix display which reduces the problem of crosstalk without substantially increasing energy requirements.

Recently, the replacement of conventional cathode ray tubes with liquid crystal matrix displays for use in small size television sets has received much attention. The use of liquid crystal technology as a display device in such items as electronic timepieces is well known. However, when a liquid crystal matrix is used as a display device in a television, the liquid crystals are required to operate at much higher performance levels and under more exacting conditions. In order to obtain the high resolution required for displaying an acceptable television image while using liquid crystal technology, a large number of picture elements or pixels are required. Each pixel must exhibit high contrast characteristics, quick response time and a large angle of visibility. In addition, the liquid crystals used in liquid crystal televisions must have stable temperature and frequency characteristics.

Several methods for driving such liquid crystal matrix display devices have been considered including: a generalized AC amplitude selective multiplexing method, a two-frequency drive method, and a switch-matrix drive method. At the present time however, only the generalized AC amplitude selective multiplexing method has been put into practical use since the other methods consume larger amounts of energy and have higher manufacturing costs.

One problem that occurs when using liquid crystal technology in television displays is crosstalk. In a liquid crystal device, by charging the opposed electrodes of the liquid crystal, a field is set up within the crystal which aligns the crystalline structure to permit the liquid crystal device to be transmissive or opaque. However, due to the nature of the crystalline structure, when a liquid crystal device has been activated to a state of opacity, a finite amount of time is required for the crystal to revert to transparency once the charge on the electrodes has been removed. When used in devices such as timepieces or calculators which require low resolution and which are not display critical, this crystal display lag time is not disruptive to viewing. However, when used as an active display device such as in a television receiver, the high scanning rates associated with each liquid crystal pixel, when coupled with crystal display lag, creates the crosstalk problem. In particular, if a liquid crystal matrix is arranged in an XY grid and a series of continuous low frequency row scanning signals are provided for each pixel sequentially, each pixel being selected by applying a voltage to the pixel's column line at a suitable time, then the crosstalk phenomenon will occur to varying degrees in each pixel which is adjacent to or substantially near a pixel which is intended to be activated and which has previously been activated. This is because the scanning rate associated with the liquid crystal matrix display is faster than the time required for each liquid crystal pixel to return to a neutral state.

In the prior art a method is known for inverting the signal applied to each liquid crystal pixel *during* the time it is activated in order to reduce the problem of crosstalk. This is known as the high frequency driving method. However, the high frequency driving method requires large energy consumption due to the amount of signal switching that is required and thus creates a power problem when used in portable battery operated liquid crystal matrix display televisions.

Accordingly it is desirable to provide an improved method for driving a liquid crystal matrix display especially for use in a television which reduces the above noted problem of crosstalk without substantially increasing energy requirements.

SUMMARY OF THE INVENTION

Generally speaking, in accordance with the invention, an improved method for driving a liquid crystal matrix display is provided. A multiplicity of liquid crystal picture elements are arranged to form a matrix along X and Y axes. A series of electrodes are connected to each common row and each common column. To activate a picture element a voltage signal, above the threshhold voltage required to actuate the liquid crystal, is provided to the appropriate row and column which intersect at the desired pixel. In practice the rows are continuously scanned with each row being activated once per frame. A multiplexed signal is provided to the column electrodes and the information to be displayed is synchronized with the row scanning rate and applied to the column electrodes to activate the desired pixels. In order to reduce the problem of crosstalk, the polarity of the signal provided to each pixel is inverted at a rate which is not greater than that necessary to activate a pixel and which is greater than the rate which will cause crosstalk but in any event which is greater than a rate necessary to scan a row without inverting.

In one embodiment of the invention every other row is inverted during the scanning of a frame.

In a further embodiment of the invention every two rows are inverted during the scanning of a frame.

Accordingly, it is an object of the invention to provide an improved method for driving a liquid crystal matrix display device.

Another object of the invention is to provide an improved method for driving a liquid crystal matrix display device which reduces crosstalk.

A further object of the invention is to provide an improved method for driving a liquid crystal matrix display device which requires low power consumption.

Still another object of the invention is to provide an improved method for scanning a liquid crystal matrix display device which reduces crosstalk and requires low power consumption, but does not add limitation on the structure of the liquid crystal matrix.

Still other objects and advantages of the invention will in part be obvious and will in part be apparent from the specification.

The invention accordingly comprises the features of construction, combination of elements and arrangement of parts which will be exemplified in the construction hereinafter set forth and the scope of the invention will be indicated in the claims.

BRIEF DESCRIPTION OF THE DRAWINGS

For a fuller understanding of the invention, reference is had to the following descriptions taken in connection with the accompanying drawings, in which:

FIG. 1 is a view of a set of electrodes oriented along an XY axis for driving a liquid crystal matrix display;

FIG. 2 is a representation of adjacent liquid crystal picture elements illustrating the crosstalk phenomenon;

FIG. 3 is a timing diagram showing the conventional low frequency driving method signals;

FIG. 4 is a timing diagram showing the conventional high frequency driving method signals;

DETAILED DESCRIPTION OF THE PREFERRED EMBODIMENTS

Figure 5:
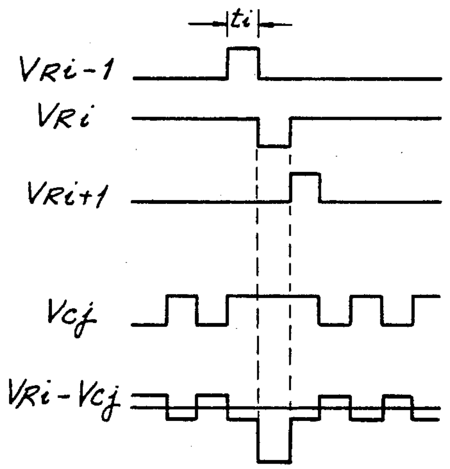
FIG. 5 is a timing diagram showing driving method signals made according to one embodiment of the invention.

Referring now to FIG. 1, a matrix of driving electrodes used in a liquid crystal matrix display device is shown. A series of liquid crystal scanning electrodes, designated as $R_l$ through $R_N$, is shown and a series of image signal electrodes, designated as $C_l$ through $C_M$ is shown. A sample pixel 2 is highlighted at the intersection of $R_i$ and $C_j$ and is designated A(i,j). In the conventional art a multiplexing technique is used to drive the rows and columns of the liquid crystal matrix display device to provide a control for activating each picture element, or pixel, such as pixel A(i,j). In a liquid crystal matrix display device used in conjunction with a portable television, there may be several thousand pixels. Therefore, provided that the duty ratio for illuminating each pixel is 1/n, n will be greater than or equal to 64. Because of the large number of pixels needed, and the high scanning rate required, a phenomenon known as crosstalk is likely to occur in the liquid crystal matrix display. Since this crosstalk phenomenon degrades the quality of the image, the occurence of crosstalk is considered to be a significant defect in the use of liquid crystal matrix display devices in small televisions.

Referring now to FIG. 2, the crosstalk phenomenon is illustrated. In this display of nine pixels it is desired that only the center pixel 2, A(i,j) be made opaque while all 8 surrounding pixels remain transparent or white. Referring again to FIG. 1, if scanning signal electrode $R_i$ and image signal electrode $C_j$ are activated while all other signal lines remain inactive, then the idealized display of a single black pixel will be realized. However, as can be seen clearly in FIG. 2, because of the high scanning rate associated with the scanning signal electrodes $R_l$ through $R_N$, this does not occur. The result is that the pixels adjacent to the activated pixel, in this case A(i−1,j) and A(i+1,j) will be actuated to a small degree yielding a gray, or partially opaqued pixel, referred to as 3.

This crosstalk phenomenon is due largely to the unbalancing of driving voltage coupled with the frequency characteristics of the liquid crystal threshhold value. This latter problem is the more difficult and significant one to solve. Liquid crystal threshhold values vary according to the image display frequency band that is used. The image display frequency band is dependent on the choice of driving method. In general, the crosstalk phenomenon exists because of the finite amount of time that is required for an activated liquid crystal picture element to return to its inactive state once a driving voltage has been removed. It will now be described how crosstalk is related to the image display frequency band with reference to the above noted conventional driving methods.

The generalized AC amplitude selective multiplexing method has two driving method variations which are well known. The first is a low frequency driving method, whose timing wave forms are illustrated in FIG. 3, and the second is a high frequency driving method whose timing signals are illustrated in FIG. 4. In FIGS. 3 and 4 $t_L$ indicates one horizontal scanning period, or the time it takes to create one individual horizontal line of the display. $V_{Ri}-1$ and $V_{Ri}+1$ indicate the voltage wave forms applied to the scanning signal electrodes immediately adjacent to $V_{Ri}$. Referring to the high frequency driving method illustrated in FIG. 4, it can be seen that the polarity of the signal applied to each horizontal electrode line is inverted once during the horizontal scanning period $t_L$.

$V_{Cj}$ indicates the wave form of the voltage which is applied to the image signal electrode, or column, $C_j$. The voltage wave forms $V_{Ri}-1$ to $V_{Ri}+1$ of the scanning signal electrodes and the voltage wave form $V_{cj}$ of the image signal electrode are represented on the basis of earth potential or a predetermined DC voltage level.

$V_{Ri}-V_{cj}$ indicates the wave form of the voltage which is applied to picture element A(i,j), which is selected by actuating the scanning signal line $R_i$ and the image signal line $C_j$. In both FIGS. 3 and 4, the display pixel A(i,j) is in a lighted state and all other pixels, are in a non lighted state i.e. A(k,j) wherein k does not equal i.

The picture elements are displayed in the same manner whether using the low frequency driving method or the high frequency driving method. However the driving frequency bands utilized by each method are quite different. The frequency band fd in use when driven by the low frequency driving method is represented as, $$fF/2 \leqq fd \leqq NfF/2 \quad (1)$$

and the frequency band fd which is utilized when driven by the high frequency method is represented as, $$NfF/2 \leqq fd \leqq NfF \quad (2)$$

wherein N is the number of scanning signal electrodes, or rows, and frame frequency fF is the inverse of the frame period, provided that the frame period is defined as a period of scanning the scanning signal electrodes $R_l$ to $R_N$ as shown in FIG. 1. In a television receiver made to operate in conformity with U.S. television standards, each frame would have a period of 1/60th of a second since U.S. images are displayed 60 times a second; 30 times a second using an interlaced technique.

As can be shown from these mathematical representations, the ratio of the frequency variation using the low frequency driving method is N while the ratio of the frequency variation using the high frequency driving method is 2. Thus, the high frequency driving method is advantageous in resolving the problems of crosstalk where the variation of the liquid crystal threshhold value depends on frequency, since the ratio of frequency variation in the high frequency driving method is smaller than that shown in the low frequency driving method. However, when utilizing the high frequency driving method, signal switching occurs often and power consumption is increased significantly. This creates a problem with liquid crystal televisions that are battery operated.

As noted above, high quality performance in the areas of contrast, responsiveness, power consumption, switching speed, etc. is required for a liquid crystal matrix display device used in a liquid crystal television, especially when compared to liquid crystal display devices used in conventional circuits. Unfortunately, no one liquid crystal material is excellent in all characteristics. One type of liquid crystal material may be inferior to another in frequency dependency of the threshhold level, but superior in contrast characteristics. Thus, the designer is faced with the choice to give up the use of liquid crystal materials or be burdened with large power consumption. As a result, it has been difficult to put liquid crystal television into practical use.

Figure 6:
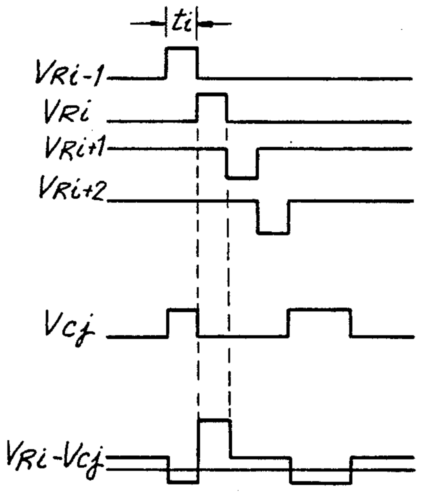
FIG. 6 is a timing diagram showing driving method signals according to another embodiment of the invention.

Referring now to FIGS. 5 and 6, two embodiments of the invention will be shown wherein the crosstalk phenomenon may be decreased without a substantial increase in power consumption.

Referring first to FIG. 5, $V_{Ri}-1$, $V_{Ri}$ and $V_{Ri}+1$ are voltage wave forms of the signal supplied to the scanning signal electrodes, respectively. $V_{Cj}$ indicates the wave form of the voltage applied to the image signal electrode $C_j$. The wave form of the voltage applied to the selected picture element, A(i,j) is indicated by the equation $V_{Ri}-V_{Cj}$. A single horizontal scanning period is indicated by $t_L$. In a manner similar to that illustrated in FIGS. 3 and 4, pixel A(i,j) is selected by the horizontal scanning signal electrode $R_i$ and the image signal electrode $C_j$ to put it into a lighted state, while all other picture elements remain in a non-lighted state. As can be seen in FIG. 5, according to the invention, the polarity of the scanning signal is inverted every other scanning line. In other words, the polarity of the (i−1)th scanning signal is positive with respect to earth potential or the potential of the predetermined DC level, the polarity of the ith scanning signal is negative, and the polarity of the (i+1)th scanning signal is positive, etc.

Additionally, according to the invention the voltage wave form $V_{Cj}$ applied to picture signal electrode $C_j$ is also inverted every other scanning signal electrode line when constructing the scanning signal using a picture signal. This is necessary so as to maintain the same absolute potential between electrodes regardless of polarity inversion. The polarity of the voltage applied to the corresponding pixel is thus inverted once per scanning signal electrode line. As indicated in FIG. 5, the wave form of the voltage which is applied to the selected pixel A(i,j) is indicated by the equation $V_{Ri}-V_{Cj}$.

When compared to the applied voltage wave form $V_{Ri}-V_{Cj}$ which is applied according to the conventional drive method, the low frequency component is largely reduced from the applied voltage wave form in accordance with the invention. In other words, a picture driving frequency which has a low frequency component near the frame frequency, and by which crosstalk may be induced, is inverted so that it now has a high frequency component. As a result, the problem of crosstalk may be reduced. Additionally, the driving frequency illustrated in FIG. 5 is one-half of the crosstalk reducing driving frequency needed in the conventional high frequency driving method shown in FIG. 4. Consequently, the driving method utilizing the embodiment of the invention illustrated in FIG. 5 permits low power consumption.

The effects obtained through the use of the invention are retained even if the polarity of the scanning signal and corresponding picture image signal are inverted from the direction shown in FIG. 5. That is, absolute inversion of the polarity of the applied voltage once per scanning signal electrode line permits improvement of crosstalk while maintaining low power consumption, regardless of actual direction.

Referring now to FIG. 6, another embodiment of the invention is shown. Once again $t_L$ indicates a single horizontal scanning period, $V_{Ri}-1$ to $V_{Ri}+2$ indicate the voltage wave forms at the scanning signal electrodes, $V_{Cj}$ indicates the wave form of the voltage applied to image signal electrode $C_j$, and the wave form of the voltage applied to pixel A(i,j) is indicated by the equation $V_{Ri}-V_{Cj}$. In this embodiment, the polarity of the wave form applied to the scanning signal electrode is inverted every two scanning signal electrode lines; that is, after every two signal lines polarity is inverted with relation to earth potential or predetermined DC level. This is in contrast to the inversion of every *other* line shown in the embodiment of the invention illustrated in FIG. 5 and the inversion of *every* line shown in the prior art at FIG. 4.

According to this embodiment, power consumption is further reduced since the drive frequency is one-half of the drive frequency shown in FIG. 5 and one-quarter of the drive frequency illustrated under the conventional high frequency driving means.

In general, it has been found that where N scanning signal electrodes are constructed so as to invert signal polarity periodically every L scanning signal electrodes, the optimum value of L is obtained experimentally under conditions of dissolution of crosstalk and reduction of power consumption. As one example, according to an experiment using an azoxy-cyanoester liquid crystal, the crosstalk phenomenon is eliminated when $L \leqq 4$, under a condition that frame scanning time is 1/60th of a second and $N=64$. In order to minimize power consumption, the optimal value of L is determined to be 4.

In an embodiment described above, the polarity of the voltage applied during one frame period is regularly inverted every 4 electrode lines, the optimal number. However, it is also within the scope of the invention that the polarity of the applied voltage is not always inverted periodically or the number of scanning signals inverted is not always the same. However, it is noted that periodic conversion of the polarity of applied voltage results in a simpler circuit construction.

Therefore, as can be seen, while in the conventional high frequency driving method the polarity of applied voltage to each scanning signal line is inverted at least once during the time that that line is selected, $t_L$, in this invention the polarity is never inverted during the scanning signal period.

Furthermore, the plurality of applied scanning signals in the conventional low frequency driving method always have the same polarity in a frame, while in a construction made according to the invention, these voltages have mixed polarities during a single frame.

In addition, according to the invention, whatever number of inversions of the polarity are determined to be optimal, the drive frequency region is within that according to the conventional low frequency driving method obtained from formula 1. As a result power consumption can be reduced and thus the invention presents a new method for driving a liquid crystal matrix display. As noted above, a noticable characteristic of the display panel made according to this invention is that the polarity of the voltage applied during a frame is inverted, making one horizontal scanning period the minimum inversion unit. The effect of this inversion is that the crosstalk phenomenon caused by the properties of the liquid crystal can be reduced significantly, while maintaining low power consumption. In particular, this invention is advantageous in that power consumption is optimized by setting the number of inversions of polarity of the voltage applied according to a comparison of the amount of crosstalk present at different inversions.

Moreover, according to this invention, a liquid crystal television is less dependent on the type of liquid crystal used. It is also easy to use and develop different kinds of liquid crystal structures which will result in a more accurate display.

Finally, it is noted in the embodiments described herein, a liquid crystal display panel has been utilized, but it is clear that this invention is applicable to other display panels not utilizing liquid crystal technology.

It will thus be seen that the objects as set forth above, and those made apparent from the preceding description, are efficiently obtained, and since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for driving a liquid crystal matrix display device, said display having a plurality of scanning signal row electrodes and a plurality of image signal column electrodes, said row electrodes and column electrodes being provided in a matrix orientation, the intersection of each row and column defining a picture element, or pixel, the scanning of all of said pixels defining a frame, the method for driving said liquid crystal matrix display device comprising sequentially selecting each scanning signal row electrode once per frame and selecting each image signal column electrode in synchronicity with the selection of a scanning signal row electrode to activate each desired row/column pixel, the polarity of the signal applied to each pixel being inverted at a rate not greater than that necessary to activate a single pixel, and greater than the rate which will cause crosstalk, but in any event greater than the rate needed to scan a row of pixels without inverting polarity.

2. The method for driving a liquid crystal matrix display device, as claimed in claim 1, wherein said matrix contains 64 scanning signal row electrodes and 64 image signal column electrodes to yield 4,096 picture elements.

3. The method for driving a liquid crystal matrix display device, as claimed in claim 2, wherein said liquid crystal is an azoxy-cyanoester liquid crystal.

4. The method for driving a liquid crystal matrix display device, as claimed in claim 3, wherein each frame is scanned 60 times a second.

5. The method for driving a liquid crystal matrix display device, as claimed in claim 4, wherein said inversion of the polarity of the signal applied to each pixel occurs every four scanning signal electrodes.

6. The method for driving a liquid crystal matrix display device, as claimed in claim 1, wherein the inversion of polarity of signal applied to each pixel occurs periodically.

7. An apparatus for driving a liquid crystal matrix display device, said matrix display having a plurality of scanning signal row electrodes and a plurality of image signal column electrodes, said row electrodes and column electrodes being provided in a matrix orientation the intersection of each row and column defining a picture element or pixel and the scanning of all of said pixels defining a frame, said apparatus comprising row electrode driving means coupled to said row electrodes; column electrode driving means coupled to said column electrodes; image signal means for receiving an image to be displayed and providing a signal coupled to said row electrode driving means and said column electrode driving means for activating a desired pixel, said row electrode driving means and said column electrode driving means being implemented so as to provide a signal to a desired pixel in response to said image signal means, the polarity of the signal applied to each pixel being inverted at a rate not greater than that necessary to activate said pixel and greater than the rate which will cause crosstalk, but in any event greater than the rate needed to scan a row of said pixels without inverting polarity.

* * * * *